United States Patent Office 3,148,220
Patented Sept. 8, 1964

3,148,220
1-ARYL-3,3,4,4-TETRAFLUORO-2,2-DIHALOCYCLO-BUTANOLS AND THE PREPARATION THEREOF
David C. England, Wilmington, Del., assignor to E. I. du Pont de Nemours and Company, Wilmington, Del., a corporation of Delaware
No Drawing. Filed May 31, 1960, Ser. No. 32,541
13 Claims. (Cl. 260—613)

This invention relates to a new class of cyclic alcohols, more particularly to the 1-aryl and 1-substituted aryl-3,3,4,4-tetrafluoro-2,2-dihalocyclobutanols, and has as its particular objects provision of the same and of a method for the preparation thereof.

It is shown in my U.S. Patents 2,996,518 of August 15, 1961, 3,030,362 of April 17, 1962, 3,036,091 of May 22, 1962, and 3,040,058 of June 19, 1962, for example, that aromatic hydrocarbons, such as benzene, toluene, and the xylenes, can serve as reaction media for the preparation of the various derivatives of the 3,3,4,4-tetrafluoro-2,2-dihalocyclobutanones disclosed and claimed in those applications.

It has now been discovered that aromatic hydrocarbons in the presence of conventional Friedel-Crafts catalysts react readily with the 3,3,4,4-tetrafluoro-2,2-dihalocyclobutanones. Similarly, quite away from these inactive solvent teachings, it has been found that aromatic compounds with polar functional substituents directly on ring carbon react spontaneously with the tetrafluorodihalocyclobutanones; whereas with nonpolar substituents a Friedel-Crafts catalyst, as with the hydrocarbons, is required. In both the catalyzed or uncatalyzed reactions, one or more ring hydrogens of the aromatic coreactant adds across the ketone carbonyl to form an hydroxyl substituent on the 1-position of the tetrafluorodihalocyclobutane moiety. The aromatic radical in the aromatic coreactant formed by the abstraction of this hydrogen adds to the 1-carbon, forming a valence bond with the remaining half of the ketone carbonyl bond which was broken and in part formed the above-referred to hydroxy linkage.

Thus, in the generic sense, the process of the present invention and the products obtained thereby can be illustrated by the following equations:

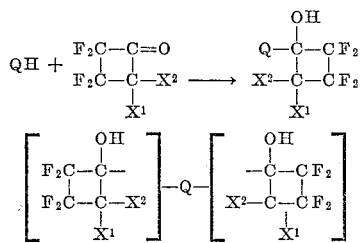

in which $X^1$ and $X^2$ are used to represent halogens of atomic number from 9 to 35 and Q is used to represent the moiety or residue of the carbocyclic aromatic organic coreactant remaining after removal of the indicated hydrogens. A preferred class of reactants and the products obtained therefrom are given by the following equation:

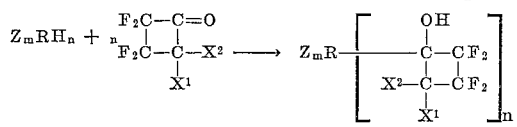

wherein R is used to represent a carbocyclic aromatic hydrocarbon radical having no more than three fused benzene rings; the Z's, which can be alike or different, are used to represent hydrogen, hydroxyl, a halogen, including specifically fluorine, chlorine, bromine, and iodine, or a monovalent hydrocarbyl, hydrocarbyloxy, or dihydrocarbylamino radical free of acyclic carbon-carbon unsaturation and in which the hydrocarbyl moieties are of no more than eight carbons each; $n$ is a small whole integer of no greater than 2 per benzene ring, and preferably no greater than 3 per molecule of the aromatic coreactant; and $m$ is likewise a small whole integer from 1 to 3.

The following examples in which the parts given are by weight are submitted to illustrate the invention further but not to limit it.

Example I

A thick walled glass reactor approximately 20 diameters long and of internal capacity corresponding to about 150 parts of water was evacuated and cooled in a liquid nitrogen bath and then charged with a mixture of 7 parts of perfluorocyclobutanone and 5.5 parts (1.5 molar proportions based on the ketone) of phenol. The reactor was then sealed and allowed to warm to room temperature, and finally heated for 60 hours at steam bath temperatures, during which time the original intensely yellow solution rapidly became colorless. The reactor was then cooled in a liquid nitrogen bath, opened, and the reaction mixture purified by distillation. There was thus obtained 8.9 parts (83% of theory) of 2,2,3,3,4,4-hexafluoro-1-(o-hydroxyphenyl)cyclobutanol as a clear, colorless liquid boiling at 94–97° C. under a pressure corresponding to 2 mm. of mercury. The product solidified on standing into hygroscopic crystals, which, after recrystallization from n-hexane and filtration under anhydrous conditions melted at 79–81° C. The nuclear magnetic resonance and infrared spectra were wholly consistent with the hexafluoro-1-(o-hydroxyphenyl)cyclobutanol structure.

*Analysis.*—Calc'd for $C_{10}H_6F_6O_2$: C, 44.1%; H, 2.2%; F, 41.9%. Found: C, 45.0%; H, 2.8%; F, 41.6%.

The preparation was repeated varying only in that 25 parts of perfluorocyclobutanone and 20 parts (1.5 molar proportions of phenol based on the ketone) were used. After workup in the same manner, there was obtained by distillation 15 parts (39.5% of theory) of the above hexafluoro-1-(o-hydroxyphenyl)cyclobutanol as a clear, colorless liquid boiling at 93–97° C. under a pressure corresponding to 1 mm. of mercury and solidfying into hygroscopic crystals which, after recrystallization from chloroform and filtration under anhydrous conditions, melted at 79–81° C. The product was further characterized as the o-isomer by warming a sample thereof in aqueous 10% potassium hydroxide solution until gas evolution had ceased, followed by acidification with dilute hydrochloric acid. The resultant white solid precipitate was removed by filtration and, upon examination, was found to be salicylic acid melting at 158–159° C. A mixed melting point with an authentic sample of salicylic acid exhibited no lowering.

The product was still further characterized as the o-isomer by ring opening of the hexafluororhydroxycyclobutyl ring under mild alkaline conditions. Thus, 5 parts of the above hexafluoro-1-(o-hydroxyphenyl)cyclobutanol was brought to the boil in 25 parts of an aqueous 10% sodium carbonate solution. The reaction mixture was cooled, acidified with dilute hydrochloric acid, and extracted with dimethyl ether. The ether extracts were dried over anhydrous calcium sulfate and, upon distillation, there was thus obtained 1.5 parts (30% conversion, 60% yield) of 2-(2,2,3,3,4,4-hexafluoro-1-hydroxybutylidene)-3,5-cyclohexadienone as a yellow liquid boiling at 64° C. under a pressure corresponding to 1 mm. of mercury; $n_D^{25}$, 1.4610. There was also recovered 2.5 parts (50% recovery) of hexafluoro-1-(o-hydroxyphenyl)cyclobutanol. The infrared and ultraviolet spectra were wholly consistent with the 4H-hexafluoro-1-hydroxybutylidene-3,5-cyclohexadienone structure. It is believed that this structure is the stabilized isomeric form, by virtue of hydrogen bonding and conjugation, of the expected 3H-hexafluoropropyl o-hydroxyphenyl ketone.

*Analysis.*—Calc'd for $C_{10}H_6F_6O_2$: C, 44.2%; H, 2.2%; F, 41.9%. Found: C, 44.5%; H, 3.5%; F, 41.8%.

Continued distillation of the original distillation residue from the isolation of the o-hydroxyphenyl product afforded 20 parts (52% of theory) of 2,2,3,3,4,4-hexafluoro-1-(p-hydroxyphenyl)cyclobutanol as a clear, colorless liquid boiling at 101–105° C. under a pressure corresponding to mm. of mercury. The product solidified on standing into white crystals which, after recrystallization from chloroform, melted at 107–108° C.

*Analysis.*—Calc'd for $C_{10}H_6F_6O_2$: C, 44.2%; H, 2.2%; F, 41.9%. Found: C, 44.2%; H, 2.6%; F, 41.8%.

The product was characterized as the p-isomer by warming a sample thereof in aqueous 10% potassium hydroxide solution until gas evolution had ceased, followed by acidification of the solution with dilute hydrochloric acid. Removal of the white precipitate and drying afforded p-hydroxybenzoic acid melting at 213–214° C. and exhibiting the same melting point in a mixed melting point determination with an authentic sample of p-hydroxybenzoic acid.

The product was still further characterized as the p-isomer by ring opening of the hydroxyhexafluorocyclobutyl ring under mild alkaline conditions. Thus, 20 parts of the above hexafluoro-1-(p-hydroxyphenyl)cyclobutanol was refluxed for 10 minutes in a solution of 5 parts of sodium carbonate in 45 parts of water. The reaction mixture was cooled, acidified with dilute hydrochloric acid, and then extracted with diethyl ether. The ether extracts were dried over anhydrous calcium sulfate and, upon distillation, there was thus obtained 17 parts (85% of theory) of 3H-hexafluoropropyl p-hydroxyphenyl ketone as a clear, colorless liquid boiling at 119° C. under a pressure corresponding to 1 mm. of mercury; $n_D^{25}$, 1.4933. On standing, the product solidified and, upon recrystallization from benzene, was obtained as white crystals melting at 46–48° C.

*Analysis.*—Calc'd for $C_{10}H_6F_6O_2$: C, 44.2%; H, 2.2%; F, 41.9%. Found: C, 44.5%; H, 2.6%; F, 41.4%.

*Example II*

As in Example I, a glass reactor was evacuated, cooled in a liquid nitrogen bath, and charged with 8 parts of perfluorocyclobutanone and 5 parts (an equimolar proportion based on the ketone) of anisole. The reactor was sealed and allowed to warm to room temperature, at which point the reaction mixture was immiscible with the top layer thereof exhibiting an intense yellow color. The reactor was heated at steam bath temperatures for 60 hours, at which point the reaction mixture, when cooled to room temperature, was white, homogeneous, and semisolid. The reactor was heated for an additional 20 hours at steam bath temperature, after which the clear liquid reaction mixture solidified at room temperature. The reactor was cooled in a liquid nitrogen bath, opened, and the resultant crystalline mass removed and recrystallized from n-hexane. There was thus obtained 11.6 parts (90% of theory) of 2,2,3,3,4,4-hexafluoro-1-(p-methoxyphenyl)cyclobutanol. Upon recrystallization from cyclohexane, the pure hexafluoro-1-(p-methoxyphenyl)cyclobutanol was obtained as white crystals melting at 59–61° C. The nuclear magnetic resonance and infrared spectra were in accord with the hexafluoro-1-(p-methoxyphenyl)cyclobutanol structure.

*Analysis.*—Calc'd for $C_{11}H_8O_2F_6$: C, 46.2%; H, 2.8%; F, 39.9%. Found: C, 46.2%; H, 3.0%; F, 40.5%.

*Example III*

As in Example I, a cylindrical glass reactor was evacuated, cooled in a liquid nitrogen bath, and charged with 15.8 parts of 2,2-dichloro-3,3,4,4-tetrafluorocyclobutanone and 9.4 parts (an equimolar proportion based on the ketone) of phenol. The reactor was sealed, warmed to room temperature, and then heated at steam bath temperatures for 16 hours. The reactor was then cooled in a solid carbon dioxide-acetone bath, opened, and the reaction mixture removed. The brownish crystalline mass was extracted with about 330 parts of boiling n-hexane. On cooling the hexane extract to —80° C., a crystalline solid separated which was removed by filtration. There was thus obtained 4.3 parts (19% of theory) of 2,2-dichloro-3,3,4,4-tetrafluoro-1-(p-hydroxyphenyl)cyclobutanol. After recrystallization from n-hexane, the pure dichlorotetrafluoro-p-hydroxyphenylcyclobutanol was obtained as white crystals melting at 94–95° C. The infrared spectrum was wholly consistent with the dichlorotetrafluorohydroxyphenylcyclobutanol structure.

*Analysis.*—Calc'd for $C_{10}H_6Cl_2F_4O_2$: C, 39.4%; H, 2.0%. Found: C, 39.9%; H, 2.2%.

*Example IV*

A glass still pot fitted with a reflux water condenser and stirring means and protected from the atmosphere with drying tubes was charged with a mixture of 4.2 parts of 2,2-dichloro-3,3,4,4-tetrafluorocyclobutanone and 2.4 parts (an equimolar proportion based on the ketone) of N,N-dimethylaniline. The reactor was heated at steam bath temperatures overnight and the greenish white solid product thus obtained removed by filtration. There was thus obtained 4.5 parts (68% of theory) of crude 2,2-dichloro-3,3,4,4-tetrafluoro-1-(p-dimethylaminophenyl)-cyclobutanol as greenish white crystals. After recrystallization and decolorization with charcoal from n-hexane, the pure dichlorotetrafluorodimethylaminophenylcyclobutanol was obtained as off-white crystals which turned yellow at 95° C. and melted at 99–101° C. The infrared spectrum was consistent with the dichlorotetrafluorodimethylaminophenylcyclobutanol structure.

*Analysis.*—Calc'd for $C_{12}H_{11}Cl_2F_4NO$: Cl, 21.4%; F, 22.9%; M.W. 332. Found: Cl, 21.6%; F, 23.6%; M.W. (ebullioscopic in benzene) 334, 337.

*Example V*

As in Example I, a cylindrical glass reactor was evacuated, cooled in a liquid nitrogen bath, and charged with 9.8 parts of 2-chloro-2,3,3,4,4-pentafluorocyclobutanone and 6.5 parts (an equimolar proportion based on the ketone) of N,N-dimethylaniline. The reactor was sealed, removed from the liquid nitrogen bath and, as the reactor warmed, an exothermic reaction occurred. The reactor was placed in a solid carbon dioxide/acetone bath to moderate the exothermic reaction, slowly allowed to warm to room temperature, and finally heated overnight at steam bath temperatures. The reactor was then cooled in an ice/water bath whereupon the reaction mixture solidified. After opening the reactor, the crystalline mass was rinsed out with n-hexane and suction-filtered. There was thus obtained 13.9 parts (85% of theory) of 2-chloro-2,3,3,4,4-pentafluoro-1-(p-dimethylaminophenyl)cyclobutanol as white crystals melting at 93–96° C. On recrystallization from n-hexane, the melting point was raised to 96.5 to 97.5° C. The infrared spectrum was wholly consistent with the chloropentafluorodimethylaminophenylcyclobutanol structure.

*Analysis.*—Calc'd for $C_{12}H_{11}ClF_5NO$: C, 46.3%; H, 3.6%; F, 30.6%; Cl, 11.4%. Found: C, 46.1%; H, 3.8%; F, 30.3%; Cl, 10.9%.

*Example VI*

As in Example I, a cylindrical glass reactor was evacuated, cooled in a liquid nitrogen bath, and charged with 7 parts of perfluorocyclobutanone and 11.5 parts (an equimolar proportion based on the ketone) of N,N-dimethylaniline. The reactor was sealed and allowed to warm while standing in an ice/water bath. After standing overnight under these conditions, the reactor was cooled in liquid nitrogen and opened. The solid product was removed therefrom and recrystallized once from benzene. There was thus obtained 22 parts (78% of theory) of crude 2,2,3,3,4,4-hexafluoro-1-(p-dimethylaminophenyl)cyclobutanol melting over the range 85–94° C. Traces of a blue impurity were removed by recrystallization from n-hexane, using decolorizing charcoal. The purified p-dimethylaminophenylhexafluorocyclobutanol was obtained as long white needles melting at 94–95° C. The infrared and nuclear magnetic spectra resonance spectra were wholly consistent with the p-dimethylaminophenylhexafluorocyclobutanol structure.

*Analysis.*—Calc'd for $C_{12}H_{11}NF_6O$: C, 48.2%; H, 3.7%; F, 38.1%; N, 4.7%. Found: C, 48.3%; H, 3.8%; F, 38.3%; N, 4.7%.

The p-dimethylaminophenylhexafluorocyclobutanol was further characterized by alkaline hydrolysis to the yellow quinoid form of p-(4H-hexafluorobutyryl)-N,N-dimethylaniline. Thus, 12 parts of the above 1-(p-dimethylaminophenyl)hexafluorocyclobutanol was dissolved in about 30 parts of 10% aqueous potassium hydroxide solution and allowed to stand at room temperature. Yellow crystals of product began to separate in about one-half hour. The reaction mixture was allowed to stand for a total of 60 hours and then diluted with an equal amount of water. The yellow crystalline product was removed by filtration and washed with dilute hydrochloric acid and water. After air-drying, there was thus obtained 11 parts (91% of theory) of the crude 4-(4H-hexafluoro-1-hydroxybutylidene)-2,5-cyclohexadienylidene dimethylammonium inner salt as yellow plates. After recrystallization from n-hexane, the yellow crystalline product, which can also be termed 4-(4H-hexafluorobutyryl)-2,5-cyclohexadienylidene dimethylammonium enol betaine or 1-(di-p-dimethyliminoniumquino)-4H-hexafluoro-n-butoxide, was obtained as beautiful, yellow plates melting at 56–57° C. The nuclear magnetic resonance spectrum was wholly in accord with the hexafluorohydroxybutylidene cyclohexadienylidene ammonium inner salt structure. The product exhibited maximum absorption in the ultraviolet at 3680 A. in ethanol solution and at 3500 A. in isooctane solution.

*Analysis.*—Calc'd for $C_{12}H_{11}NF_6O$: C, 48.2%; H, 3.7%; F, 38.1%; N, 4.7%; M.W. 299. Found: C, 48.3%; H, 3.7%; F, 38.2%; N, 5.0%; M.W. 312, 302 (ebullioscopic in benzene).

The above yellow quinoid product was further characterized by conversion to the non-quinoid hydrochloride dihydrate salt. Thus, 2 parts of the above yellow hydrohexafluorohydroxybutylidene cyclohexadienylidene dimethylammonium inner salt was dissolved in about 30 parts of concentrated hydrochloric acid, with spontaneous warming, to afford a white solution, which solution was cooled in an ice/water bath and diluted with about 20 parts of water. The white crystalline product which separated was removed by filtration, and after being washed with a cold 30/20 parts by volume concentrated hydrochloric acid/water solution and air-dried, the dihydrate of the monohydrochloride salt of p-(4H-hexafluorobutyryl)-N,N-dimethylaniline was obtained as white crystals melting at 92–95° C. The product which can also be described as the dihydrate of the monohydrochloride of 3H-hexafluoropropyl p-dimethylaminophenyl ketone exhibited infrared absorption at 5.8 microns.

*Analysis.*—Calc'd for $C_{12}H_{11}NF_6O \cdot HCl \cdot 2H_2O$: F, 30.7%; Cl, 9.5%. Found: F, 30.5%; Cl, 9.6%.

The above yellow 4H-hexafluoro-1-hydroxybutylidene-2,5-cyclohexadieneylidene dimethylammonium inner salt was still further characterized by base hydrolysis to p-dimethylaminobenzoic acid. Thus, 3 parts of the 4-(4H-hexafluoro-1-hydroxybutylidene)-2,5-cyclohexadienylidene dimethylammonium inner salt was added to a solution of 5 parts of potassium hydroxide in a mixture of 5 parts of water and about 15 parts of ethanol. The resulting solution became colorless on warming. After heating overnight at steam bath temperatures, the mixture was neutralized with aqueous hydrochloric acid. The neutral solution was filtered and the somewhat discolored precipitate recrystallized from methanol, using decolorizing charcoal. There was thus obtained 1.1 parts (68% of theory) of p-dimethylaminobenzoic acid as white crystals melting at 238–239° C. versus a reported melting point of 242.5° C. to 243.5° C. as given at page 276, Heilbron, "Dictionary of Organic Compounds," vol. II, Oxford University Press, New York (1953).

*Example VII*

As in Example I, a cylindrical glass reactor was evacuated, cooled in liquid nitrogen, and charged with 1.0 part of anhydrous aluminum chloride, 44 parts of benzene, and 26 parts of perfluorocyclobutanone. The reactor was sealed after being evacuated and then warmed up to about 40° C. A rapid exothermic reaction occurred and the reaction mixture became light blue and homogeneous. The reactor was then allowed to stand at room temperature overnight, then cooled in liquid nitrogen, and opened. The reaction mixture was then washed with dilute hydrochloric acid, dried, and upon distillation there was thus obtained 36 parts (96% of theory) of 2,2,3,3,4-hexafluoro-1-phenylcyclobutanol as a clear, colorless liquid boiling at 134° C. under a pressure corresponding to 130 mm. of mercury; $n_D^{25}$, 1.4333. The nuclear magnetic resonance and infrared spectra were wholly consistent with the phenylhexafluorocyclobutanol structure.

*Analysis.*—Calc'd for $C_{10}H_6F_6O$: C, 46.9%; H, 2.4%; F, 44.5%. Found: C, 47.0%; H, 2.8%; F, 44.5%.

A similar preparation substituting phosphorus pentoxide as catalyst in place of the aluminum chloride and heating overnight at steam-bath temperatures afforded the same phenylhexafluorocyclobutanol in 26% conversion.

In the same manner, another cylindrical glass reactor was charged with 1 part of anhydrous aluminum chloride, 34 parts of perfluorocyclobutanone, and 3.5 parts (0.2 molar proportion based on the ketone) of benzene while being cooled in a liquid nitrogen bath. The reactor was then evacuated and sealed, warmed to room temperature, and finally heated at steam bath temperatures for 4 hours. The reactor was then cooled in liquid nitrogen and opened, and the reaction mixture purified by distillation. There was thus recovered 4 parts (about 12% recovery) of perfluorocyclobutanone. As a first fraction, there was obtained 4.0 parts (35% of theory) of crude hexafluoro-1-phenylcyclobutanol as a clear, colorless liquid boiling at 53° C. under a pressure corresponding to 18 mm. of mercury. As a second fraction, there was obtained 9.8 parts (50% of theory) of crude 1,1'-phenylenebis-hexafluorocyclobutanol as a clear, colorless liquid boiling at 154–156° C. under a pressure corresponding to 18 mm. of mercury. The product, which can also be described as bis(hexafluoro-1-hydroxycyclobutyl)benzene, solidified on cooling. After two recrystallizations from chloroform, the pure product exhibited a melting point of 115–117° C. The infrared and nuclear magnetic resonance spectra were in accord with the phenylene-bis(hexafluorocyclobutanol) structure.

*Analysis.*—Calc'd for $C_{14}H_6F_{12}O_2$: C, 38.7%; H, 1.4%; F, 52.5%. Found: C, 38.8%; H, 1.3%; F, 52.3%.

The above hexafluorophenylcyclobutanol was further characterized by aqueous base hydrolysis to phenyl 3H-hexafluoropropyl ketone. Thus, 30 parts of hexafluoro-1-phenylcyclobutanol was added to a solution of 5 parts of sodium carbonate in 45 parts of water and the resultant mixture refluxed for 1 hour. The mixture remained immiscible and after cooling was extracted with diethyl ether. Acidification of the aqueous layer with hydrochloric acid afforded a precipitate of benzoic acid, melting point 122.0–122.5° C., identified by mixed melting point with an authentic sample of benzoic acid (melting point and mixed melting point, 122–123° C.). The diethyl ether layer was dried and distilled to afford 25 parts (83% of theory) of phenyl 3H-hexafluoropropyl ketone as a clear, colorless liquid boiling at 142° C. under a pressure corresponding to 130 mm. of mercury; $n_D^{25}$, 1.4345. The nuclear magnetic resonance and infrared spectra were wholly in accord with the phenyl 3H-hexafluoropropyl ketone structure.

*Analysis.*—Calc'd for $C_{10}H_6F_6O$: C, 46.9%; H, 2.4%. Found: C, 47.3%; H, 2.6%.

The above 1,1'-phenylenebis(hexafluorocyclobutanol) was also further characterized by aqueous base hydrolysis to diketone. Thus, 10 parts of the above phenylene-bis(hexafluorocyclobutanol) was refluxed in a solution of 5 parts of sodium carbonate in 45 parts of water for a period of 5 minutes. The reaction mixture was then cooled and extracted with diethyl ether. On acidification of the aqueous layer, there was obtained about 1 part of solid benzenedicarboxylic acid. The ethyl ether layer was dried over anhydrous calcium sulfate and, upon distillation, there was obtained therefrom 6.7 parts (67% of theory) of phenylene-bis(3H-hexafluoropropyl ketone) as a clear, colorless liquid boiling at 100° C. under a pressure corresponding to 1 mm. of mercury; $n_D^{25}$, 1.4185.

*Analysis.*—Calc'd for $C_{14}H_6F_{12}O_2$: C, 38.6%; H, 1.4%; F, 52.5%. Found: C, 39.3%; H, 1.8%; F, 52.5%.

*Example VIII*

As in Example I, a cylindrical glass reactor was evacuated, cooled in a liquid nitrogen bath, and charged with 19 parts of perfluorocyclobutanone, 43.5 parts (4.5 molar proportion based on the ketone) of toluene, and 0.5 part of phosphorus pentoxide. The reactor was sealed, warmed to room temperature, and then heated at steam bath temperatures overnight. The reactor was then cooled in liquid nitrogen, opened, and the reaction mixture purified by distillation. There was thus obtained 22.6 parts (78% of theory) of 2,2,3,3,4,4-hexafluoro-1-(p-tolyl)cyclobutanol as a clear, colorless liquid boiling at 98° C. under a pressure corresponding to 11 mm. of mercury; $n_D^{25}$, 1.4397. The infrared and nuclear magnetic resonance spectra were wholly consistent with the hexafluoro-p-tolylcyclobutanol structure.

*Analysis.*—Calc'd for $C_7H_8F_6O$: C, 48.9%; H, 3.0%; F, 42.2%. Found: C, 49.0%; H, 3.3%; F, 42.1%.

The reaction was repeated varying only in that 29 parts of perfluorocyclobutanone, 30.5 parts (2 molar proportions based on the ketone) of toluene, and 2 parts of boron trifluoride were charged. The sealed reactor was allowed to stand at room temperature for 60 hours. The reactor was then cooled in a liquid nitrogen bath, opened, and the liquid reaction mixture removed and purified by distillation. There was thus obtained 36 parts (82% of theory) of 2,2,3,3,4,4-hexafluoro-1-(p-tolyl)cyclobutanol as a clear, colorless liquid boiling at 108° C. under a pressure corresponding to 20 mm. of mercury; $n_D^{25}$, 1.4396. The hexafluoro-p-tolylcyclobutanol was further characterized by aqueous base hydrolysis to p-toluic acid. Thus, a portion of the above hexafluoro-1-(p-tolyl)cyclobutanol was heated in aqueous 10% potassium hydroxide solution until gas evolution ceased. The reaction mixture was then acidified and the crystalline p-toluic acid isolated by filtration and dried. After recrystallization from toluene, the p-toluic acid melted at 180–181° C. Mixed melting point with an authentic sample of p-toluic acid proved the structure (melting point of an authentic sample, 180.5–181.5° C.; mixed melting point, 180.5–181.5°C.).

*Example IX*

As in Example I, a cylindrical glass reactor was evacuated, cooled in a liquid nitrogen bath, and charged with 15.8 parts of chlorobenzene, 25 parts (an equimolar proportion based on chlorobenzene) of perfluorocyclobutanone, and 1 part of anhydrous aluminum chloride. The reactor was sealed and warmed to room temperature. An exothermic reaction occurred, affording a homogeneous, purple, liquid reaction mixture. The reactor was cooled in a liquid nitrogen bath, opened, and the reaction mixture removed, washed with dilute hydrochloric acid, and finally extracted with diethyl ether. The ether extract was dried over anhydrous calcium sulfate and the ether solvent removed by distillation. Continued distillation afforded 32 parts (78% of theory) of 2,2,3,3,4,4-hexafluoro-1-(p-chlorophenyl)cyclobutanol as a clear, colorless liquid boiling at 102° C. under a pressure corresponding to 10 mm. of mercury; $n_D^{25}$, 1.4550.

*Analysis.*—Calc'd for $C_{10}H_5F_6ClO$: C, 41.3%; H, 1.7%; F, 39.2%; Cl, 12.2%. Found: C, 41.8%; H, 1.8%; F, 39.6%; Cl, 11.9%.

*Example X*

As in Example I, a cylindrical glass reactor was evacuated, cooled in a liquid nitrogen bath, and charged with 15 parts of perfluorocyclobutanone, 15 parts (1.25 molar proportions based on the ketone) of β-methylnaphthalene, and 0.5 part of phosphorus pentoxide catalyst. The reactor was sealed and warmed to room temperature, at which point an exothermic reaction occurred. The reactor was then heated to steam bath temperatures, with no refluxing of the reaction mixture occurring thereby indicating completion of the reaction. The reactor was held for 7 hours at steam bath temperatures to assure completion. The reactor was then cooled in a liquid nitrogen bath, opened, and the reaction mixture removed. On distillation, there was obtained 21 parts (78% of theory) of 2,2,3,3,4,4-hexafluoro-1-(β-methylnaphthyl)cyclobutanol as a clear, colorless liquid boiling at 114° C. under a pressure corresponding to 1 mm. of mercury; $n_D^{25}$, 1.5131. The infrared and nuclear magnetic resonance spectra were wholly consistent with the hexafluoro-β-methylnaphthylcyclobutanol structure.

*Analysis.*—Calc'd for $C_{15}H_{10}F_6O$: C, 56.3%; H, 3.2%; F, 35.6%. Found: C, 55.9%; H, 3.4%; F, 335.6%.

The reaction was repeated varying only in using 31 parts (1.65 molar proportions based on the β-methylnaphthylene) of perfluorocyclobutanone and heating for only 1 hour at steam bath temperatures. The liquid reaction mixture was washed with dilute hydrochloric acid and extracted with anhydrous diethyl ether. The ether extract was dried over anhydrous calcium sulfate. Upon distillation, there was thus obtained 20.7 parts (37% of theory) of hexafluoro-1-(β-methylnaphthyl)cyclobutanol and 10.4 parts (18.5% of theory, making a total of 55.5% of theory based on the β-methylnaphthalene) of 1,1'-β-methylnaphthylene bis(hexafluorocyclobutanol as a clear, colorless liquid boiling at 160° C. under a pressure corresponding to 1 mm. of mercury. The product set to a glass at room temperature.

*Analysis.*—Calc'd for $C_{19}H_{10}F_{12}O_2$: C, 45.8%; H, 2.0%; F, 45.8%. Found: C, 45.9%; H, 2.3%; F, 44.6%.

*Example XI*

As in Example I, a cylindrical glass reactor was evacuated, cooled in a liquid nitrogen bath, and charged with 24 parts of perfluorocyclobutanone, 26 parts (1.3 molar proportions based on the ketone) of o-dichlorobenzene, and 1.5 parts of anhydrous aluminum chloride catalyst. The reactor was sealed and allowed to warm to room temperature at which point an exothermic reaction occurred resulting in a dark liquid reaction mixture. The reactor was cooled in a liquid nitrogen bath and opened. The liquid reaction mixture was washed with dilute hydrochloric acid, extracted with diethyl ether, and the ether extract dried over anhydrous calcium sulfate. Upon distillation, there was obtained 36.8 parts (84% of theory) of 2,2,3,3,4,4-hexafluoro-1-(o-dichlorophenyl)cyclobutanol as a clear, colorless liquid boiling at 75° C. under a pressure corresponding to 1 mm. of mercury; $n_D^{25}$, 1.4741. The infrared and nuclear magnetic resonance spectra were wholly consistent with the hexafluoro-1-(o-dichlorophenyl)cyclobutanol structure.

*Analysis.*—Calc'd for $C_{10}H_4F_6Cl_2O$: F, 35.1%; Cl, 21.8%. Found: F, 35.0%; Cl, 21.6%.

Example XII

As in Example I, a cylindrical glass reactor was evacuated, cooled in a liquid nitrogen bath, and charged with 40 parts of perfluorocyclobutanone, 19 parts (0.5 molar proportion based on the ketone) of diphenyl ether, and 0.5 part of anhydrous aluminum chloride catalyst. The reactor was sealed and warmed to room temperature, at which point an exothermic reaction occurred. The reactor was heated overnight at steam bath temperature, then cooled in a liquid nitrogen bath, and opened. The liquid reaction mixture was removed and purified by distillation. There was thus obtained 44.5 parts (80% of theory) of oxydi-p-phenylene-bis-1,1'-(perfluorocyclobutanol) as a viscous syrup boiling at 168° C. under a pressure corresponding to 1 mm. of mercury. The product crystallized on standing and on recrystallization from carbon tetrachloride was obtained as white plates melting at 73–75° C. Two further recrystallizations from carbon tetrachloride, with 92% recovery each time, afforded the pure oxydi - p - phenylene-bis(hexafluorocyclobutanol) structure.

*Analysis.*—Calc'd for $C_{20}H_{10}F_{12}O_3$: C, 45.7%; H, 1.9%; F, 43.3%. Found: C, 45.8%; H, 2.3%; F, 43.2%.

The reaction was repeated, using slightly different proportions and reaction conditions. Thus, two cylindrical glass reactors as in Example I were evacuated, cooled in a liquid nitrogen bath, and one was charged with 15 parts of diphenyl ether, 32 parts (2.0 molar proportions based on the ether) of perfluorocyclobutanone, and 0.5 part of aluminum chloride catalyst and the other with 16 parts of diphenyl ether, 34 parts (2.0 molar proportions based on the ether) of perfluorocyclobutanone, and 0.5 part of aluminum chloride catalyst. The reactors were sealed, warmed to room temperature, and heated at steam bath temperature for 1 hour. The reactors were then cooled in a liquid nitrogen bath, opened, and the liquid reaction mixtures combined and purified by distillation. There was thus recovered 5 parts of perfluorocyclobutanone and about 1 part of diphenyl ether. Continued distillation afforded 13.5 parts (22% of theory) of 2,2,3,3,4,4-hexafluoro-1-(p-phenoxyphenyl)cyclobutanol as a clear, colorless liquid boiling at 127° C. under a pressure corresponding to 1 mm. of mercury; $n_D^{25}$, 1.5032. On standing, the product solidified and, after recrystallization from n-hexane, was obtained as white crystals melting at 74–75° C.

*Analysis.*—Calc'd for $C_{16}H_{10}F_6O_2$: C, 55.2%; H, 2.9%; F, 32.8%. Found: C, 55.3%; H, 3.0%; F, 32.8%.

On continued distillation, there was also obtained 44.6 parts (48.5% of theory) of the above oxydi-p-phenylene-bis-1,1'-(hexafluorocyclobutanol) as a viscous syrup boiling at 161° C. under a pressure corresponding to 1 mm. of mercury; $n_D^{25}$, 1.4762. On standing, the product solidified and, after recrystallization from carbon tetrachloride, was obtained as white plates melting at 74–77° C.

Example XIII

As in Example I, a cylindrical glass reactor was cooled in a liquid nitrogen bath, evacuated, and charged with a mixture of 14 parts of perfluorocyclobutanone, 26.4 parts (4.3 molar proportions based on the ketone) of benzene, and 10 parts (about 2.0 molar proportions based on the ketone) of boron trifluoride. The reactor was sealed, allowed to warm to room temperature, and heated at steam bath temperatures overnight. The reactor was then cooled in a liquid nitrogen bath, opened, and the reaction mixture removed therefrom with the aid of 100 parts of water. The resultant aqueous mixture was separated by distillation. There was thus obtained 18.8 parts (about 93% of theory) of 2,2,3,3,4,4-hexafluoro-1-phenylcyclobutanol as a clear, colorless liquid boiling at 84° C. under a pressure corresponding to 15 mm. of mercury; $n_D^{25}$, 1.4328.

Example XIV

As in Example IV, a glass reactor, fitted with a reflux condenser and drying means, was charged with 10 parts of 1,1'-phenylene-bis(hexafluorocyclobutanol)—see Example VII—22 parts (10 molar proportions based on the diol) of toluene, and 35 parts of phosphorus pentoxide. The reaction mixture was heated at the reflux for 2 hours and an additional 22 parts of toluene and 10 parts of phosphorus pentoxide were added. The reaction mixture was heated at the reflux for an additional 20 hours, at which point 10 further parts of phosphorus pentoxide was added and the reaction mixture was heated at the reflux for an additional 10 hours. The reaction mixture was cooled and added slowly to 200 parts of water. The aqueous reaction mixture was extracted with about 75 parts of diethyl ether. The ether extract was dried over anhydrous magnesium sulfate and the ether removed by distillation. On continued distillation, there was thus obtained 5.5 parts (47% of theory) of 2,2,3,3,4,4-hexafluoro - 1 - [2',2',3',4',4'-hexafluoro-1'-(p-tolyl)cyclobutylphenyl]cyclobutanol as a clear, colorless liquid boiling at 142° C. under a pressure corresponding to 1 mm. of mercury; $n_D^{25}$, 1.4662.

*Analysis.*—Calc'd for $C_{21}H_{12}F_{12}O$: C, 49.7%; H, 2.4%; F, 44.9%. Found: C, 49.9%; H, 2.8%; F, 44.8%.

Example XV

As in Example I, a cylindrical glass reactor was cooled in a liquid nitrogen bath, evacuated, and charged with a mixture of five parts of naphthalene, 17 parts (2.4 molar proportions based on the naphthalene) of perfluorocyclobutanone, and about 15 parts of chloroform. The reactor was sealed, allowed to warm to room temperature, and heated at steam bath temperatures for 60 hours. The reactor was then cooled in a liquid nitrogen bath, opened, and the volatile material removed therefrom by distillation. There was thus recovered 24 parts of a mixture of solvent and unreacted perfluorocyclobutanone. From the 12 parts of the crude higher boiling residue remaining, distillation afforded 9.9 parts (83% of theory) of a semi-solid mixture of 2,2,3,3,4,4-hexafluoro-1-(α-naphthyl)cyclobutanol and 2,2,3,3,4,4-hexafluoro-1-(β-naphthyl)cyclobutanol, boiling at 100–102° C. under a pressure corresponding to 0.1 mm. of mercury. Upon recrystallization from n-hexane, there was obtained 2.4 parts of the pure β-isomer as crystals melting at 72–73° C. This product was further characterized by refluxing 0.5 part thereof in 10 parts of aqueous 10% sodium hydroxide solution, followed by acidification, filtration of the resulting solid product, and finally drying. There was thus obtained 0.3 part of β-naphthoic acid melting at 184–185° C. versus a reported melting point of 184° C.

The present invention is generic to the 1-aryl-3,3,4,4-tetrafluoro-2,2-dihalocyclobutanols, and it is likewise generic to the preparation thereof from the 3,3,4,4-tetrafluoro-2,2-dihalocyclobutanones and aromatic compounds. The reaction involves addition of hydrogen on nuclear aromatic carbon across the carbonyl double bond of the tetrafluorodihalocyclobutanones forming the 1-hydroxyl group by scission of half of the carbonyl double bond, with the remaining half of the bond forming linkage with the aryl radical arising from abstraction of the said nuclear hydrogen. Depending on the stoichiometry and the number of available such nuclear hydrogen atoms, more than one such 1-hydroxy-3,3,4,4-tetrafluoro-2,2-dihalocyclobutane moiety can be involved. Generally no more than three such will be involved in any one organic coreactant.

As stated previously, the reaction depends, in those instances where the aromatic coreactant is not sufficiently chemically reactive, on the use of a Friedel-Crafts catalyst. Conventional Friedel-Crafts catalysts can be used such as the aluminum chlorides and bromides, boron trichloride, boron trifluoride, phosphorus pentoxide, antimony pentachloride, silicon tetrachloride, zinc dichloride, mercuric dichloride, hydrogen fluoride, ferric chloride, chloroacetic acid, and the like.

The need for catalysts can be determined by considering the chemical structure of the aromatic coreactant. In those instances wherein the aromatic coreactant contains a strongly polar, chemically reactive group or groups, such as the hydroxy group in the case of the aromatic phenols, or the strongly polar amino groups, such as the dimethylamine substituent and other dialkylamine substituents, no catalyst will be required and the requisite 1-aryl-substituted 3,3,4,4-tetrafluoro-2,2-dihalocyclobutanol will be obtained directly. In those instances where the aryl coreactant contains no substituent, such as benzene, or if it does contain a substituent which is a strongly inactive chemical substituent, such as an alkyl substituent on aromatic nucleus, or halogen, such as chlorine, bromine, iodine, or chlorine on aromatic ring carbon, or in those instances where the substituent is essentially buried as in the case of a diaryl ether, catalysts will be needed. The Friedel-Crafts catalyst will normally be used in amounts from 0.1 to 5%, by weight, based on the ketone and/or aromatic coreactant.

Reactivity of aromatic compounds can be illustrated by the following series arranged in order of decreasing activity: N,N-dimethylaniline, phenol, anisole, toluene, benzene, chlorobenzene. Some catalysts arranged roughly in order of decreasing activity are: $P_2O_5$, $FeCl_3$, $AlCl_3$, $BF_3$.

Thus, N,N-dimethylaniline reacts with perfluorocyclobutanone without a catalyst below room temperature. Phenol reacts with warming on the steam bath for about 1 hour. Anisole requires heating for about 20 hours on the steam bath without a catalyst. The reaction could be rapid with a mild catalyst such as $P_2O_5$. Toluene reacts at steam bath temperature slowly with $P_2O_5$ as catalyst. The reaction is rapid below room temperature using $AlCl_3$ as catalyst. Chlorobenzene does not react with $P_2O_5$ as catalyst but reacts below room temperature with $AlCl_3$ as catalyst.

The reaction is a simple one and requires no complicated operating procedures or equipment. Generally the reaction is carried out in sealed reactors, of which the most convenient are glass or glass-lined reactors. Because of the relatively low boiling nature of some of the 3,3,4,4-tetrafluoro-2,2-dihalocyclobutanones and likewise because of the extreme chemical reactivity of these compounds, e.g., with, for instance, water, and especially with some of the present coreactants, the reaction will generally be carried out by cooling the reactor to liquid nitrogen temperatures or at least to those of solid carbon dioxide (about −80° C.), charging the particular 3,3,4,4-tetrafluoro-2,2-dihalocyclobutanone involved, as well as the aromatic coreactant, purging the reaction vessel with nitrogen, sealing, and allowing the reactor to warm slowly to room temperature. With the higher boiling ketones and ketone hydrates, sealed systems are not required and are not normally used, although they may be. The reaction in these instances will simply be carried out under anhydrous conditions. Elevated temperatures up to 150–200° C. can be and sometimes must be used.

The reaction is effected thermally and catalytically. Depending on the relative reactivity of the tetrafluorodihalocyclobutanones and the particular aromatic coreactant involved, the necessary reaction temperatures and reaction times will vary. With the more reactive pairs, the reaction is spontaneous and exothermic, sometimes even at low temperatures. Accordingly, appropriate care should be taken in charging the reactants. Normally temperatures in the range 75–80° C. will suffice for most of the systems. Reaction times will vary from a few minutes to a few hours. In the case of the less reactive systems, higher temperatures and longer reaction times, e.g., up to a few days, will be needed. Temperatures higher than in the range 150–200° C. will normally not be required. Under these conditions, even with the less reactive systems, reaction times required will be, at most, a few hours to a few days. For convenience, an overnight period is frequently used. In those instances wherein the reaction is carried out in a sealed reactor at temperatures above the boiling points of the ketones, the reaction will, of course, be affected at elevated pressures. No externally applied pressure is required. The simple autogenous pressure of the reactants under the temperature conditions used will suffice.

The reaction mixtures are worked up quite simply to obtain the tetrafluorodihalohydroxycyclobutyl-substituted products of the present invention. Thus, at the completion of the reaction it is only necessary to open the reactor, distill away any unreacted tetrafluorodihalocyclobutanone or aromatic coreactant, and isolate and purify the desired products.

The reaction can be effected properly in the presence or absence of an inert organic reaction medium which, if present, should be anhydrous. Any inert liquid organic diluent can be used, and, generally speaking, the most common are the normally liquid aliphatic and cycloaliphatic hydrocarbons, polyfluorohydrocarbons, and ethers, including aliphatic hydrocarbons such as the hexanes, heptanes, octanes, and the like; cycloaliphatic hydrocarbon solvents, such as cyclohexane, and the like; aliphatic hydrocarbon ethers, such as dipropyl and dibutyl ethers, and the like; the polyfluoroaliphatic hydrocarbons, e.g., 1,1,2,2-tetrafluoro-3,3-dimethylbutane, and the like; the polyfluoroaliphatic/cycloaliphatic hydrocarbons, e.g., perfluorodimethylcyclohexane, and the like. The choice of the particular diluent if used is not at all critical, and will vary with such other normal variables as the temperature found necessary to effect reaction. In most instances, in order to simplify the reaction, no diluent is used. The requisite tetrafluorodihalocyclobutanone and aromatic coreactants are simply mixed and heated together as described previously and the product isolated therefrom after the reaction has been completed. The absence of a diluent generally makes separation of unreacted material and the desired products easier.

From the foregoing, it is apparent that in preparing these new tetrafluorodihalohydroxycyclobutyl-substituted products, there can be used any 3,3,4,4-tetrafluoro-2,2-dihalocyclobutanone where the two halogen substituents are of atomic number from 9 to 35, inclusive, i.e., fluorine, chlorine, and bromine, alike or different. More specifically, there can be used perfluorocyclobutanone, 2-chloro-2,3,3,4,4 - pentafluorocyclobutanone, 2-bromo-2,3,3,4,4-pentafluorocyclobutanone, 2-bromo-2-chloro-3,3,4,4-tetrafluorocyclobutanone, 2,2-dichloro-3,3,4,4-tetrafluorocyclobutanone, and 2,2 - dibromo-3,3,4,4-tetrafluorocyclobutanone.

Of these polyfluorocyclobutanones, various chlorofluorocyclobutanones have been disclosed in U. S. Patents 2,712,554 and −5, although no detailed method for the preparation thereof is given. Perfluorocyclobutanone is claimed in my U.S. Patent 3,030,995, issued June 19, 1962. All of these polyfluoroperhalocyclobutanones can be readily prepared by the cycloaddition reaction between perfluorovinyl hydrocarbyl ethers with the requisite 1,1-dihalo-2,2-difluoroethylenes, followed by hydrolysis of the resultant 1-hydrocarbyloxy-1,3,3,4,4-pentafluoro-2,2-dihalocyclobutanes, all as disclosed and claimed in detail in the copending application of England, Serial No. 717,805. These cyclobutanones are generically gaseous to liquid, depending on the total molecular weight which varies with the halogens, quite reactive materials which preferably should be handled under anhydrous conditions.

As the aromatic coreactant with the just-described tetrafluorodihalocyclobutanones to make the new (3,3,4,4-tetrafluoro-2,2-dihalo-1 - hydroxycyclobutyl)substituted aromatic products of the present invention, there can be used any aromatic compound of no more than three fused benzene rings carrying at least one hydrogen on aromatic ring carbon and free of any acyclic carbon-carbon unsaturation. In addition to the required at least one hydrogen on nuclear carbon of the aromatic coreactant, the remaining nuclear carbons thereof can carry hydrogen or one or more halogen, including expressly fluorine, chlorine, bromine, and iodine, hydroxy, hydrocarbyl, hydrocarbyloxy, or dihydrocarbylamino radicals, all free of acyclic carbon-carbon double bonds, i.e., all being aliphatically saturated, and the hydrocarbyl moieties being of no more than eight carbons each. Thus, there can be used in the preparation of the new 1-aryl-3,3,4,4-tetrafluoro-2,2-dihalocyclobutanols such aromatic coreactants carrying at least one hydrogen on nuclear carbon thereof as fluorobenzene, o-dichlorobenzene, bromobenzene, iodobenzene, m-dihydroxybenzene, n-octyloxybenzene, N,N-di-n-octylaminobenzene, n-octylbenzene, p-chlorophenol, and p-methoxyphenol.

Using the reaction conditions outlined in the foregoing, there will be obtained from the specific 3,3,4,4-tetrafluoro-2,2-dihalocyclobutanones and the nuclear hydrogen-bearing aromatic coreactants just discussed generically and illustrated with suitable specific examples additional 3,3,4,4-tetrafluoro-2,2 - dihalo - 1 - hydroxycyclobutyl-substituted aromatic products of the present invention. More specifically, from one molar proportion of fluorobenzene and one molar proportion of perfluorcyclobutanone in the presence of catalytic amounts of aluminum chloride, there will be obtained 2,2,3,3,4,4-hexafluoro-1-(p-fluorophenyl)cyclobutanol. From equimolar proportions of o-dibromobenzene and 2-chloro-2,3,3,4,4-pentafluorocyclobutanone and catalytic amounts of aluminum chloride, there will be obtained 2-chloro-2,3,3,4,4-pentafluoro-1-(3,5 - dichlorophenyl)cyclobutanol. From equimolar proportions of bromonaphthalene and 2,2-dichloro-3,3,4,4-tetrafluorocyclobutanone and catalytic amounts of P$_2$O$_5$, there will be obtained 2,2-dichloro-3, 3,4,4 - tetrafluoro - 1 - (5 - bromonaphthyl)cyclobutanol. From equimolar proportions of iodobenzene and 2-bromo-2,3,3,4,4-pentafluorocyclobutanone and catalytic quantities of aluminum chloride, there will be obtained 2-bromo-2,3,3,4,4-pentafluoro-1 - (p - iodophenyl) - cyclobutanol. From equimolar proportions of m-dihydroxybenzene and 2,2-dibromo-3,3,4,4-tetrafluorocyclobutanone and catalytic amounts of P$_2$O$_5$, there will be obtained 2,2-dibromo-3,3,4,4 - tetrafluoro - 1-(3,5-dihydroxyphenyl)-cyclobutanol. From equimolar proportions of n-octyloxybenzene, i.e., octyl phenyl ether, and 2-bromo-2-chloro-3,3,4,4-tetrafluorocyclobutanone and catalytic amounts of aluminum chloride, there will be obtained 2-bromo-2-chloro-3,3,4,4 - tetrafluoro -1- (p-octyloxyphenyl)cyclobutanol. From equimolar proportions of N,N-di-n-octylaminobenzene and perfluorocyclobutanone and catalytic amounts of BF$_3$, there will be obtained 2,2,3,3,4,4-hexafluoro-1-(p-N,N-dioctylaminophenyl)cyclobutanol. From equimolar proportions of n-octylanthracene and perfluorocyclobutanone and catalytic amounts of BF$_3$, there will be obtained 2,2,3,3,4,4-hexafluoro-1 - (6-octylanthryl)cyclobutanol. From equimolar proportions of p-chlorophenol and 2,2-dichloro-3,3,4,4-tetrafluorocyclobutanone and catalytic amounts of P$_2$O$_5$, there will be obtained, 2,2-dichloro-3,3,4,4-tetrafluoro-1-(2-hydroxy-5 - chlorophenyl)-cyclobutanol. From equimolar proportions of p-methoxyphenol and 2-chloro-2,3,3,4,4-pentafluorocyclobutanone and catalytic quantities of P$_2$O$_5$, there will be obtained 2-chloro-2,3,3,4,4-pentafluoro - 1 - (2-hydroxy-5-methoxyphenyl)cyclobutanol.

While the aforesaid specific disclosures call for equimolar proportions of the tetrafluoro-2,2-dihaloketones and the aromatic coreactants, the same 1-aryl-substituted 3,3,4,4 - tetrafluoro-2,2-dihalocyclobutanols will be obtained if these coreactants are charged in differing molar proportions. Excesses of the ketone can and frequently will be used. Excesses of the aromatic coreactant can be used, but this will not normally be envisaged. In those instances with the more reactive tetrafluorodihalo-cyclobtanones and the more reactive aromatic coreactants carrying the polar functional substituents when the ketone is charged in substantial excess of 1:1 stoichiometry, two or more molecules of the ketone will react with the aromatic coreactant to give products containing a plurality of 3,3,4,4-tetrafluoro-2,2-dihalo-1-hydroxycyclobutyl substituents on the aromatic residue. For instance, from two molar proportions of perfluorocyclobutanine and one molar proportion of anisole in the presence of catalytic quantities of P$_2$O$_5$, there will be obtained methoxyphenylene-bis[1,1'-(3,3,4,4-tetrafluoro - 2,2-dihalocyclobutanol)]. In those instances where the more reactive cyclobutanones are charged in appreciable stoichiometric excesses, and particularly with the more reactive organic coreactants, and most especially in those instances with the more effective Friedel-Crafts catalyst, particularly when relatively large catalytic amounts are charged, some of the 2:1 dehydration products, i.e., the 1,1-diaryl-3,3,4, 4-tetrafluoro-2,2-dihalocyclobutanes of copending, coassigned and application of Ellingboe Serial No. 32,514, filed herewith will also be obtained.

The new products of this invention are useful both as intermediates and as end products. Thus, as illustrated in the foregoing examples in detail, the various 1-aryl-substituted 3,3,4,4-tetrafluoro-2,2-dihalocyclobutanols of the present invention are readily convertible by aqueous base hydrolysis under relatively mild conditions to the corresponding 3H - 3,3 - dihalo-1,1,2,2-tetrafluoropropyl aryl ketones. More stringent treatment with aqueous alkali, e.g., at higher temperatures and/or at stronger concentrations, readily converts the 1-aryl-3,3,4,4-tetrafluoro-2,2-dihalocyclobutanols of the present invention to the corresponding aromatic carboxylic acids, with the carboxyl group arising from complete hydrolysis of the 3,3,4, 4 - tetrafluoro - 2,2-dihalo - 1 - hydrocyclobutane moiety. These aromatic mono-, di-, and tricarboxylic acids, depending upon how many 3,3,4,4-tetrafluoro-2,2-dihalo-1-hydroxycyclobutane moieties were present, are all known products of established utility, with the polycarboxylic acids being of a special utility in the formation of linear condensation polyamides, polyesters, and polyesteramides by conventional techniques.

These new 1-aryl - 3,3,4,4 - tetrafluoro-2,2-dihalocyclobutanols are generically useful as solvents for highly fluorinated polymers, for instance, the polyfluorinated olefins or more precisely the polymers of polyfluorinated olefins. Solutions of such polymers, e.g., polytetrafluoroethylene, polychlorotrifluoroethylene, and the like, in these 1-aryl-3,3,4,4-tetrafluoro-2,2-dihalocyclobutanols are readily obtained by heating the polymers at approximately 1–20% weight concentration in the 1-aryl substituted tetrafluorodihalocyclobutanols, conveniently at the reflux. Such solutions are useful in rendering waterproof and water repellent such shaped objects of cellulose as paper, wood, and the like, as well as in forming films and fibers and other shaped products of the polyfluorinated olefin polymers. In addition to their excellent waterproofing and water repellent-rendering properties, solutions of these polyfluorinated olefin polymers are also useful in rendering such shaped objects of cellulose non-supportive of combustion or markedly decreasing the tendency such materials normally have for burning. More specifically:

*Example A*

Approximately 20% by weight solutions of a low molecular weight, relatively low melting tetrafluoroethylene polymer (melting range, 83–150° C.) in each of the 2,2, 3,3,4,4 - hexafluoro-1-(hydroxyphenyl)cyclobutanols of Example I were prepared by heating the polymer in each of the cyclobutanols at the reflux. Strips of filter paper were immersed in each of the hot solutions, removed, and the cyclobutanol solvent completely removed therefrom by treatment with acetone. The thus treated strips were then dried, and on testing it was found that the treated strips were water-repellent and somewhat resistant to burning. In contrast, of course, untreated control strips of the same filter paper were rapidly and completely wet on contact with water and, furthermore, burned rapidly when subjected to a flame.

The same results were obtained using the 2,2,3,3,4,4-hexafluoro-1-(p-methoxyphenyl)cyclobutanol of Example II, the 2,2,3,3,4,4-hexafluoro-1-(p-dimethylaminophenyl)cyclobutanol of Example IV, the 2,2,3,3,4,4-hexafluoro-1-(phenyl)cyclobutanol and the phenylene-bis-1,1'-(2,2,3,3,4,4-hexafluorocyclobutanol) of Example VII, the 2,2,3,3,4,4-hexafluoro-1-(p-chlorophenyl)cyclobutanol of Example IX, the 2,2,3,3,4,4-hexafluoro-1-(p-tolyl)cyclobutanol of Example VIII, the 2,2-dichloro-3,3,4,4-tetrafluoro-1-(p-hydroxyphenyl)cyclobutanol of Example III, the 2,2-dichloro-3,3,4,4-tetrafluoro-1-(p-dimethylaminophenyl)cyclobutanol of Example IV, the 2-chloro-2,3,3,4,4-pentafluoro-1-(p-dimethylaminophenyl)cyclobutanol of Example V, the 2,2,3,3,4,4-hexafluoro-1-(p-phenoxyphenyl)cyclobutanol and the oxydi-p-phenylene-bis-1,1'-(2,2,3,3,4,4-hexafluorocyclobutanol) of Example XIV, the 2,2,3,3,4,4 - hexafluoro-1-(o-dichlorophenyl)cyclobutanol of Example XI, and the 2,2,3,3,4,4-hexafluoro-1-(β-methylnaphthyl)cyclobutanol and the β-methylnaphthylene-bis (1,1'-(2,2,3,3,4,4-hexafluorocyclobutanol) of Example X.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

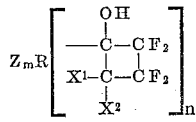

wherein R is a carbocyclic aromatic hydrocarbon group having no more than three fused rings; $n$ is a small whole number no greater than 2 per benzene ring in said aromatic hydrocarbon group; $m$ is a small whole integer from 1 to 3; the Z's, which can be different, are selected from the group consisting of hydrogen, hydroxyl and halogen and monovalent hydrocarbyl, hydrocarbyloxy, and dihydrocarbylamino radicals free from acyclic carbon-carbon unsaturation and in which the hydrocarbyl moieties are of no more than 8 carbons each; and $X^1$ and $X^2$ are halogen of atomic number from 9 to 35.

2. The process of producing a compound of claim 1 which comprises reacting, at a temperature in the range $-20$ to $+100°$ C., a 3,3,4,4-tetrafluoro-2,2-dihalocyclobutanone wherein all halogen is of atomic number 9–35 with a carbocyclic aromatic compound bearing annular hydrogen in the presence of a Friedel-Crafts agent, said carbocyclic aromatic compound being one having up to 3 fused rings and up to 3 substituents per ring selected from the group consisting of hydroxyl, halogen and monovalent hydrocarbyl, hydrocarbyloxy and dihydrocarbylamino radicals free from acyclic carbon-carbon unsaturation in which the hydrocarbyl moieties are of no more than 8 carbons each.

3. The process of claim 2 wherein the cyclobutanone is perfluorocyclobutanone.

4. 2,2,3,3,4,4 - hexafluoro-1-(o-hydroxyphenyl)cyclobutanol.

5. Oxydi-p-phenylene-bis-1,1'-perfluorocyclobutanol.

6. 2,2,3,3,4,4-hexafluoro-1-phenylcyclobutanol.

7. 2,2,3,3,4,4 - hexafluoro-(p - chlorophenyl)cyclobutanol.

8. 2,2,3,3,4,4-hexafluoro-1-(p-tolyl)cyclobutanol.

9. The process of producing 2,2,3,3,4,4-hexafluoro-1-(o-hydroxyphenyl)cyclobutanol which comprises reacting, at a temperature in the range $-20$ to $+100°$ C., perfluorocyclobutanone and phenol.

10. The process of producing oxydi-p-phenylene-bis-1,1'-(perfluorocyclobutanol) which comprises reacting, at a temperature in the range $-20$ to $+100°$ C., perfluorocyclobutanone and diphenyl ether in the presence of a Friedel-Crafts agent.

11. The process of producing 2,2,3,3,4,4-hexafluoro-1-phenylcyclobutanol which comprises reacting, at a temperature in the range $-20$ to $+100°$ C., perfluorocyclobutanone and benzene in the presence of a Friedel-Crafts agent.

12. The process of producing 2,2,3,3,4,4-hexafluoro-1-(p-chlorophenyl)cyclobutanol which comprises reacting, at a temperature in the range $-20$ to $+100°$ C., perfluorocyclobutanone and chlorobenzene in the presence of a Friedel-Crafts agent.

13. The process of producing 2,2,3,3,4,4-hexafluoro-1-(p-tolyl)cyclobutanol which comprises reacting, at a temperature in the range $-20$ to $+100°$ C., perfluorocyclobutanone and toluene in the presence of a Friedel-Crafts agent.

References Cited in the file of this patent

UNITED STATES PATENTS

| | | |
|---|---|---|
| 2,831,879 | Weinmayn | Apr. 22, 1958 |
| 2,900,401 | Hardy et al. | Aug. 18, 1959 |
| 2,915,561 | Carpenter et al. | Dec. 1, 1959 |
| 2,930,817 | Feit | Mar. 29, 1960 |

UNITED STATES PATENT OFFICE
CERTIFICATE OF CORRECTION

Patent No. 3,148,220    September 8, 1964

David C. England

It is hereby certified that error appears in the above numbered patent requiring correction and that the said Letters Patent should read as corrected below.

Column 16, line 17, for "-hexafluoro-(p-" read ---hexafluoro-1-(p- ---.

Signed and sealed this 29th day of December 1964.

(SEAL)
Attest:

ERNEST W. SWIDER
Attesting Officer

EDWARD J. BRENNER
Commissioner of Patents